Sept. 12, 1944.   H. O. PETERSON   2,358,028
MONITORING RECEIVER
Filed May 18, 1942
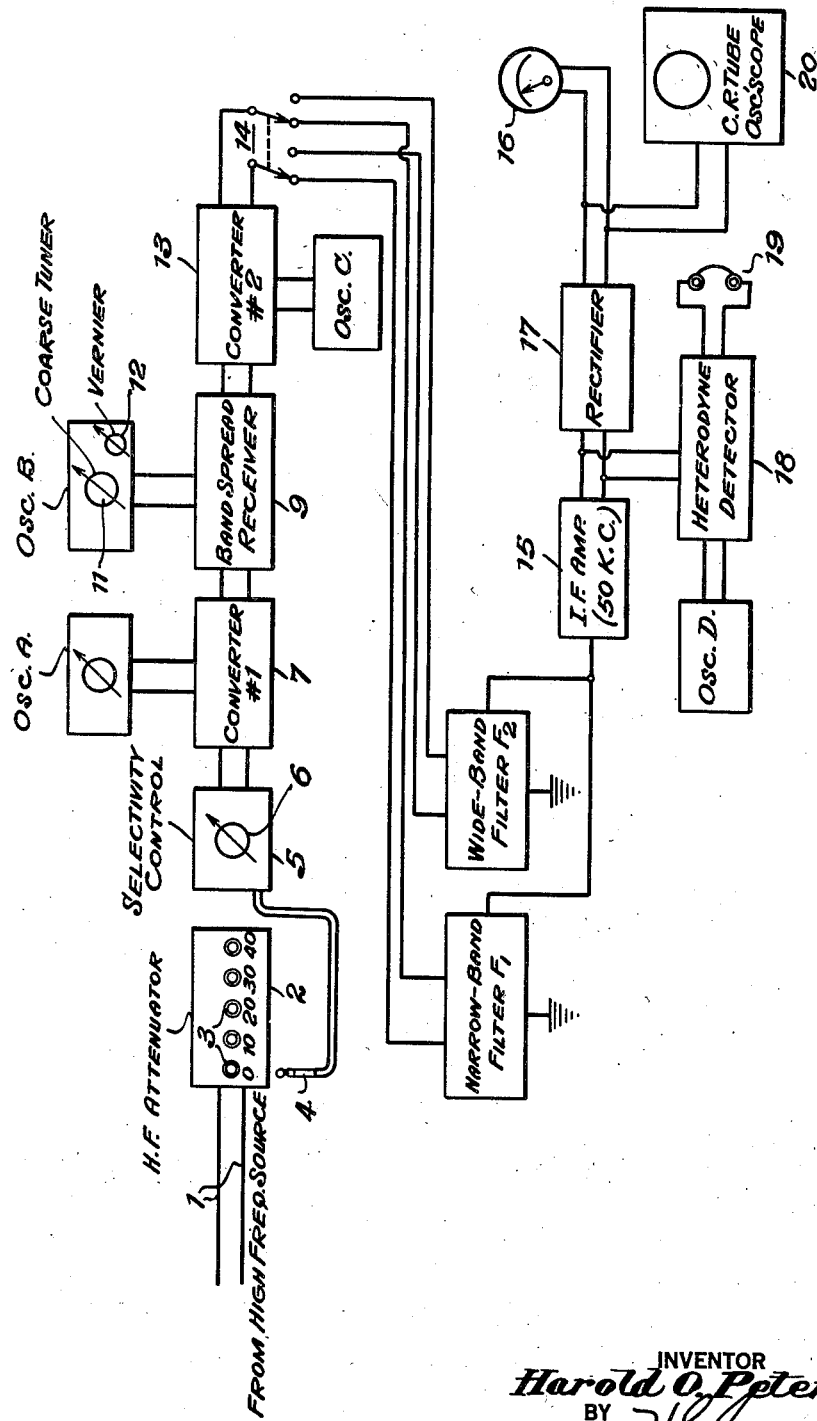
INVENTOR
*Harold O. Peterson*
BY
ATTORNEY

Patented Sept. 12, 1944

2,358,028

UNITED STATES PATENT OFFICE 2,358,028

MONITORING RECEIVER

Harold O. Peterson, Riverhead, N. Y., assignor to Radio Corporation of America, a corporation of Delaware Application May 18, 1942, Serial No. 443,348

8 Claims. (Cl. 250—17)

This invention relates to a monitoring receiver. In order to control and adjust the parameters of a radio transmitter, it is frequently desirable to monitor its output in such a manner as to measure separately each of the various side-band components. Apparatus for making such an analysis with satisfactory precision requires a number of component parts all of which may be coordinated for obtaining the necessary measurements for a full understanding of the transmitter characteristics.

It is an object of my invention to provide a monitoring receiver having various controls arranged for convenient and rapid analysis of the different radio frequency components in the energy radiated by a given transmitter, thereby to perfect the adjustments of the transmitter circuits.

Other objects and advantages of my invention will be made apparent in the description to follow. This description is accompanied by a drawing, the sole figure of which represents diagrammatically a preferred circuit arrangement, together with component units for readily analyzing any radio frequency energy throughout a wide frequency spectrum.

Referring to the drawing, I show an attenuator 2, the input leads 1 for which may be connected to any high-frequency source. The source may be a direct coupling to the transmitter or it may be a pick-up means such as an antenna.

The attenuator 2 is preferably provided with an arrangement of jacks 3, in any one of which a plug 4 may be inserted for deriving a desired attenuation. These jacks are illustratively labelled with respect to the number of decibels of attenuation, say from 0 d. b. to 40 d. b.

The plug 4 is connected to the input leads for a selectivity control unit 5. The purpose of this unit is to discriminate against image response. Adjustment is obtained by means of a control knob 6.

From the unit 5 the radio frequency signal is passed to a first converter 7 in which it is heterodyned with oscillations from an oscillator unit labelled "Osc. A." Within the range of transmitter frequencies for which this apparatus is particularly adapted, it is intended to deliver an output from the first converter at a frequency on the order of 2 megacycles. Other frequencies may, however, be delivered if desired.

The 2-megacycle output from the converter #1 is next delivered to a band-spread receiver unit 9. The RCA type AR-60 receiver is illustrative of a convenient unit to be used in this connection. Heterodyning is obtained by means of oscillator B. Oscillator B is provided with a coarse tuner 11 and a vernier tuner 12. The output from the band-spread receiver 9 may be on the order of 700 kilocycles and this output when delivered to converter #2 in the unit 13 may be heterodyned by means of an oscillator C to produce a converted frequency on the order of 50 kilocycles. This output is fed to the switch blade terminals of a double-pole double-throw switch 14. In the left-hand position, switch 14 delivers signals to the narrow band filter $F_1$. In the right-hand position of the switch 14, the signals are delivered to a wide band filter $F_2$. The purpose of the narrow band filter is to discriminate in favor of different side-bands. If a particular side-band is to be analyzed, then a crystal filter with a band width of approximately 25 cycles may be used. When the transmitter output is modulated by keying, then the key clicks can be analyzed by means of the filter $F_2$. Such a filter would preferably have a band width on the order of 4000 cycles.

Irrespective of which of the two filters $F_1$ or $F_2$ is switched in, the output may be fed to an intermediate frequency amplifier unit 15. This amplifier is illustratively labelled for acceptance of a frequency on the order of 50 kilocycles. This frequency may be indicated and measured by suitable devices such as the meter 16 to which the signal is fed after rectification in the unit 17. The signal may also be passed to a heterodyne detector 18 which, in cooperation with the oscillator D, delivers an audio frequency output such as can be sensed in the phones 19. Furthermore, the output from the rectifier 17 may be passed to the input leads of a cathode ray tube oscilloscope 20 so as to provide a visual analysis of the wave components.

It will be observed that the circuit arrangement, shown in the drawing and described hereinabove, lends itself to convenient use for analyzing any desired radio frequency output together with its modulation side-bands.

I am aware that numerous devices have been developed in the past for the purpose of monitoring radio frequency signals, but none of these have proven to have the advantages that are to be found in the circuit arrangement and combination of units as herein disclosed. My invention, therefore, is limited only in accordance with the claims.

What I claim is:

1. In an arrangement for monitoring the output from a radio transmitter, a variable attenuator for passing a high frequency wave from a given source to a responsive system, said system including a selectivity control unit and a plurality of converter units, a band spread receiver electrically interposed between a first and a second of said converter units, an intermediate frequency amplifier for translating the output from said second converter unit, means including a switch and two alternatively useable filters for passing either a very narrow band or a relatively wide band of output frequencies from said second converter unit to said amplifier, and responsive means connected to said amplifier for analytically indicating the output components therefrom.

2. The combination according to claim 1 and including a rectifier electrically interposed between said amplifier and said responsive means.

3. The combination according to claim 1 and including a cathode ray tube oscilloscope in said responsive means.

4. The combination according to claim 1 and including a heterodyne detector and an audio-frequency sound reproducer in said responsive means.

5. The combination according to claim 1 and including in said responsive means an electrical measuring instrument, and means for passing rectified currents from said amplifier to said instrument.

6. Apparatus for monitoring the output components from a given radio transmitter, said apparatus comprising means for attenuating said components to a desired degree, translating means connectible to said attenuating means and including a frequency selectivity control device, a plurality of converters arranged to successively heterodyne said components and derivatives therefrom with waves of at least two different frequencies, a band spread receiver electrically interposed between two of said converters, filters arranged to be selectively connected to receive output energy from the final one of said converters, thereby to obtain either a very narrow band or a relatively wide band of frequencies, means for rectifying the filtered derivatives, and means for graphically reproducing the rectified wave form so obtained.

7. A monitoring receiver having a variable attenuator, a selectivity control device, at least two heterodyne oscillator-converter units, a bandspread receiver interposed in circuit between said converter units, a pair of alternatively useable filter units, one having an appreciably wider band-pass characteristic than the other, signal translating means, and means for connectively associating the aforesaid elements so that energy is fed from the attenuator successively through the selectivity control device, the first converter unit, the band spread receiver, the second converter unit, one of the filter units, and thence to the signal translating means.

8. A receiver in accordance with claim 7 and including switching means whereby the second of said converter units is connected optionally to the narrow-band filter unit or to the wide-band filter unit.

HAROLD O. PETERSON.